April 27, 1954      L. LEE II      2,677,023
FLUID FLOW RESPONSIVE SWITCH
Filed July 24, 1950
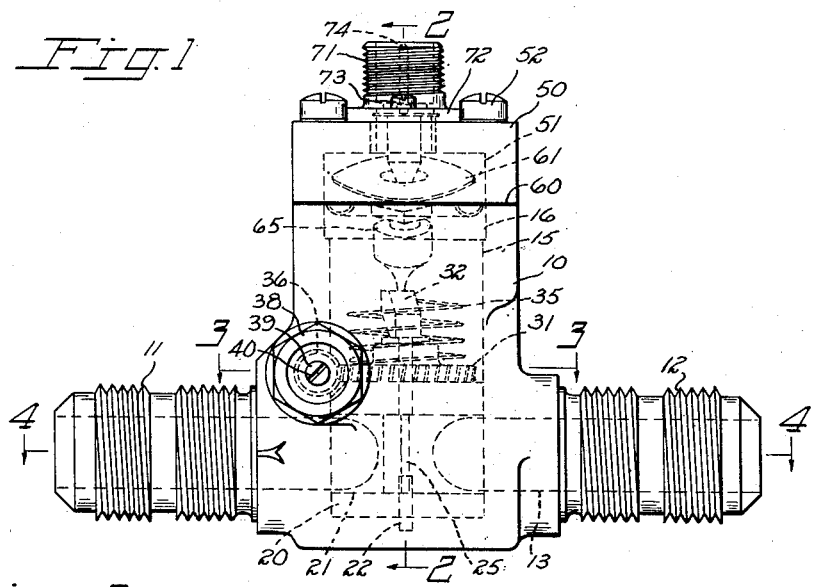
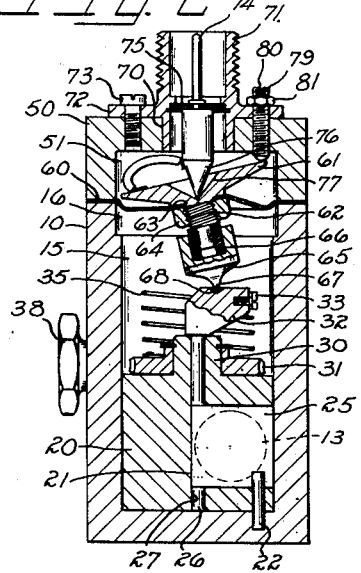
Inventor
LEIGHTON LEE II
By
Lindsey and Prutzman
ATTORNEYS Patented Apr. 27, 1954

2,677,023

UNITED STATES PATENT OFFICE 2,677,023

FLUID FLOW RESPONSIVE SWITCH

Leighton Lee II, Rocky Hill, Conn.

Application July 24, 1950, Serial No. 175,511

8 Claims. (Cl. 200—81.9)

The present invention relates generally to flow indicating means and more particularly to a device which is intended for connection in a fluid conduit which has a high sensitivity to flow of fluid through the device and which can be used to indicate whether or not any flow is taking place.

In many instances where fluid conduits are installed, it is important to have positive knowledge of whether or not there is any flow of fluid in the line. This is particularly important, for example, in oil lines and the like utilized with aircraft engines, particularly where the engines are utilized under extremely low temperature conditions. It frequently happens in installations of this type that the usual pressure instruments will indicate sufficient pressure on the line to cause flow of fluid therethrough but because the material which is carried through the lines is frozen or so viscous as to resist flow at that pressure, there actually will be no flow of fluid through the line. The result is that frequently accidents and/or damage results because the operator assumes from the pressure readings that there is a flow in the conduit line when, in fact, there is none.

It is an aim of the present invention to provide a device of simple construction and design which can be readily and easily inserted in a fluid conduit line without interfering in any way with the normal operation of the line and which will be sensitive to the flow conditions existing in the line and which can be utilized to indicate this condition in a simple manner.

Included in the foregoing aim is the object of providing a device of very great sensitivity which is adjustable and which can be easily regulated to indicate any desired minimum flow conditions.

A further aim of the invention is to provide a device of the character described which can be utilized to operate an electrical signaling means without, however, introducing any electrical contacting means or the like in the vicinity of the fluid being carried through the conduit and also without permitting any leakage of fluid outwardly through the device.

A further object of the invention is to provide a device of the character described which is of small size and which can be manufactured economically and at small cost and yet which will be foolproof in operation and rugged in construction so that it will operate effectively and reliably over long periods of time.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a full scale side view of one embodiment of the device.

Fig. 2 is a vertical cross-sectional view taken along the line 2—2 of Fig. 1.

Fig. 3 is a cross-sectional view taken along the line 3—3 of Fig. 1, and

Fig. 4 is a cross-sectional view taken along the line 4—4 of Fig. 1.

Referring to the drawings, the device of the present invention comprises a main generally rectangular body 10 having threaded nipples 11 and 12 at opposite sides thereof for connection in the usual manner by means of couplings to a fluid conduit, the latter being omitted from the drawings. As best shown in Figs. 3 and 4 of the drawings, the nipples 11 and 12 are offset, in plan view, from the center of the body 10 and the body 10 and nipples 11 and 12 are provided with a through bore 13 which forms in effect a continuation of the conduits to which the device it attached. The body 10 has a central vertical bore 15 which communicates with the through bore 13 and at the top thereof there is provided an enlarged counterbore 16.

Seated within the central vertical bore 15 and resting on the bottom thereof is a cylinder 20 having a notch 21 milled therein which is in registry with the through bore 13. The cylinder 20 is properly located and fixed within the bore 15 to align the notch 21 with bore 13 by means of pin 22.

Disposed within the notch 21 is a vane or gate 25 which is mounted along its one edge on a spindle 26 which is rotatably received in an axial bore 27 extending through the cylinder 20. When the vane is in the closed position, i. e. abutting against the pin 22, as shown in Figs. 2 and 4 of the drawings, the passageway through the through bore 13 is closed and any movement of the fluid through the through bore 13 will result in deflection of the vane 25.

The top of the cylinder 20 is formed with a stud-like extension 30 on which is rotatably mounted a worm gear 31. The spindle 26 extends outwardly through the stud portion 30 and has fixed to its outer end a crank 32. Attached at one end to the worm gear 31 and at the other end to the crank 32 as by means of screw 33, is a light torsion spring 35. The rotated position of the worm gear 31 is determined by a worm 36 which is disposed in a transverse bore 37 and is in mesh with the worm gear 31. The worm 36 is held in place by a threaded bushing 38 and is provided with a stem 39 extending outwardly through the bushing, the stem being provided with a notch 40 or other means through which the worm may be turned by any suitable turning tool, such as a screw driver or the like. An O-ring 41 of suitable packing material may be provided to prevent leakage of fluid around the worm 36.

By turning the worm 36 and hence the worm gear 31, the spring load on crank 32 and hence on the vane 25 may be carefully adjusted so that the vane will be sensitive to any desired amount of flow through the through bore 13. In a commercial embodiment of the present device, the force of the spring 35 may be adjusted so that the vane will be moved by rates of flow as low as 0.1 foot per second.

In accordance with the invention, the position of the vane 25 is indicated by means which will prevent any possible leakage of fluid from the device and in a manner which will permit an electrical indication of the position of the vane without introducing any electrical contacts within the fluid containing portions of the device.

As best shown in Figs. 1 and 2 of the drawings, there is provided a cover 50 for the body 10 having a bore 51 corresponding to the counterbore 16 of the body 10. The cover 50 is adapted to be bolted in place on top of the body 10 by means of bolts 52. Clamped between the meeting edges of the cover 50 and the body 10 is a flexible diaphragm 60 composed of rubber, leather, plastic or other flexible material which operates to seal the top of the body 10.

Centrally of the diaphragm 60 is a cup-shaped or generally disk-shaped member 61 having a threaded stud 62 formed integrally on the bottom thereof which extends through a central opening 63 in the diaphragm 60. The cup-shaped member 61 is clamped to the diaphragm by a nut 64 which is received on the threaded stud 62 and which forms a fluidproof seal.

The lower end of the stud 62 is received in a nipple 65 and insulated therefrom by an insulating bushing 66. The nose portion 67 of the nipple 65 is received in an indentation 68 on the crank 32, this indentation 68 being offset from the turning axis of spindle 26.

As will be apparent, any movement of the vane 25 will be transmitted by the construction described into gyrating movement of the cup-shaped member 61. In accordance with the invention, the gyrating movement of the cup-shaped member 61 may be utilized to function electrically operated indicating means. As best shown in Figs. 1 and 2 of the drawings, the cover 50 is formed with a central opening 70 in which is received a threaded bushing 71 having a flange 72 overlying the top surface of the cover 50. The bushing 71 is bolted in place by bolts 73 (shown one) extending through the flange 72.

Extending centrally of the bushing 71 is an electrical connector consisting of prong 74 which is held in place by an insulating disk 75. Fixed to the lower end of the prong 74 is a pivot member 76 which engages in a conical depression 77 in the cup-shaped member 61 and by providing a fixed pivot stabilizes the gyrating movement of member 61. An electrical conducting wire extending between the pointed member 76 and the cup-shaped member 61 ensures a good electrical connection therebetween.

Also extending through the flange 72 and cover 50 into the bore 51 is a setscrew 79 which is notched at 80 to permit convenient turning of the same for adjustment purposes and which is locked in adjusted position by means of a locknut 81. The setscrew 79 is of sufficient length to engage against the periphery of the cup-shaped member 61, and in the usual setting of the device will provide a contact with the periphery of the cup-shaped member 61 at a gyrated position of the member 61 corresponding to the closed position of the vane 25. Accordingly, an electrical contact will be provided between the cup-shaped member 61 and the setscrew 79 whenever there is no flow of fluid through the device and the contact will be opened whenever there is sufficient flow to displace the vane 25 from closed position, the amount of flow necessary to accomplish this displacement being determined by the setting of the worm 36, which in turn determines the load on spring 35.

As will be apparent, an electrical circuit (not shown) when connected to the prong 74 and the setscrew 79 will be closed when the vane 25 is in position indicating no flow through the device and the circuit will be opened when the vane is displaced from the no-flow position. If desired, a signal lamp or other device may be utilized to indicate when the circuit is closed.

As will be apparent, the device of the present invention is of simple construction and of small size so that it may be readily and conveniently connected into a fluid line without any disruption of normal function of the line. By adjusting worm 36, the vane 25 may be rendered sensitive to any desired rate of flow through the device, and any desired movement of the vane may be indicated electrically, if desired, by proper setting of the setscrew. Loss of fluid through the device or danger from arcing is effectively eliminated. Accordingly, there is provided a highly sensitive and foolproof device whereby the absence of a desired amount of flow in a conduit can be immediately detected by simple indicating means.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A device for indicating the condition of flow in a fluid conduit comprising a housing having a passageway therethough for connection to the conduit, a vane, means including a rotatable spindle secured to the vane for mounting the vane for swinging movement toward and away from a position extending across the passageway, a worm wheel mounted for rotation about the axis of the spindle, a worm in the housing engaging the worm wheel and having turning means operable from the exterior of the housing, spring means extending between the spindle and the worm wheel for urging the vane into said position extending across the passageway, offset means actuatable by said rotatable spindle, and a member located for engagement by said offset means when said vane is in a predetermined angular position.

2. A device for indicating the condition of flow in a fluid conduit comprising a housing having a passageway therethrough for connection to the conduit and a bore disposed transversely to said passageway, a single vane, means for mounting the vane in the passageway for movement from a closed position to a predetermined open position responsive to flow of fluid therethrough, a diaphragm closing said transverse bore, an electrical conductor mounted for gyrating movement and extending through the diaphragm, means for gyrating the conductor in response to movement of the vane, and an electrical contact arranged to engage the conductor in gyrated position thereof corresponding to a selected predetermined position of said vane.

3. A device for indicating the condition of flow in a fluid conduit comprising a housing having a passageway therethrough for connection to the conduit and a bore disposed transversely of the passageway, a vane, means including a rotatable spindle secured to the vane for mounting the vane for swinging movement toward and away from a position extending across the passageway, a control spring biasing said vane toward closed position, a flexible diaphragm closing said transverse bore, a conductor member mounted for gyrating movement extending through the diaphragm, means forming a fluid-tight connection between the diaphragm and member, means on the spindle offset from the axis thereof for gyrating the member in response to swinging movement of the vane and an electrical contact arranged to engage said member in gyrated position thereof corresponding to a selected predetermined position of said vane.

4. A device for indicating the condition of flow in a fluid conduit comprising a housing having a passageway therethrough for connection to the conduit and a bore disposed transversely of the passageway, a vane, means including a rotatable spindle disposed in the bore for mounting the vane for swinging movement toward and away from a position extending across the passageway, a control spring biasing said vane toward closed position, a flexible diaphragm closing said transverse bore, a generally disk-like member mounted for gyrating movement and having a projection extending through the diaphragm into said bore, means including a crank on the spindle engaging said projection for gyrating said disk-like member in response to swinging movement of the vane, and means forming an electrical contact with the disk-like member when the latter is in a predetermined gyrated position.

5. A device for indicating the lack of flow of fluid in a fluid conduit comprising a housing having a passageway therethrough for connection to the conduit and a bore disposed transversely of the passageway, a vane, means includig a rotatable spindle disposed in the bore and secured along one edge of the vane for mounting the vane for swinging movement toward and away from a position extending across the passageway, said vane being adapted to be moved away from said position by the flow of fluid through the passageway, means biasing the vane into said position, a flexible diaphragm closing said transverse bore, a generally disk-like electrical conductor mounted for gyrating movement and having a projection extending through the diaphragm into said bore, means including a member on the spindle and offset from the axis thereof engaging said projection for gyrating the disk-like conductor in response to swinging movement of the vane, and an electrical contact comprising an adjustable setscrew for providing an electrical contact with the disk-like conductor when the latter is in the gyrated position to which it is moved when the vane is in said position extending across the passageway.

6. A device for indicating the condition of flow in a fluid conduit comprising a housing having a passageway therethrough for connection to the conduit and a bore disposed transversely of the passageway, a vane, means including a rotatable spindle secured to the vane for mounting the vane for swinging movement toward and away from a position extending across the passageway, a control spring biasing said vane toward closed position, an electrical conductor mounted for gyrating movement within said bore, linkage means including a crank interconnecting said conductor and said spindle for gyrating said conductor in response to swinging movement of said vane, an electrical contact disposed in said bore engageable with said conductor in the gyrated position thereof corresponding to closed position of the vane, and means forming a fluid-tight seal in said bore between said contact and said passageway.

7. A device for indicatig the condition of flow in a fluid conduit comprising a housing having a passageway therethrough for connection to the conduit and a bore disposed transversely of the passageway, a vane, means including a rotatable spindle secured to the vane for mounting the vane for swinging movement toward and away from a position extending across the passageway, spring means secured to the spindle for urging said vane into closed position, an electrical conductor mounted for gyrating movement within said bore, linkage means including a crank interconnecting said conductor and said spindle for gyrating said conductor in response to swinging movement of said vane, an electrical contact disposed in said bore engageable with said conductor in the gyrated position thereof corresponding to closed position of the vane, and means forming a fluid-tight seal in said bore between said contact and said passageway.

8. A device for indicating the condition of flow in a fluid conduit comprising a housing having a passageway therethrough for connection to the conduit and a bore disposed transversely of the passageway, a vane, means including a rotatable spindle secured to the vane for mounting the vane for swinging movement toward and away from a position extending across the passageway, an electrical conductor mounted for gyrating movement within said bore, linkage means including a crank interconnecting said conductor and said spindle for gyrating said conductor in response to swinging movement of said vane, a worm wheel mounted for rotation about the axis of said spindle, a worm in the housing engaging the worm wheel and having turning means operable from the exterior of the housing, a torsion spring extending between said crank and said worm wheel for urging the vane into closed position, an electrical contact comprising an adjustable set screw extending into said bore for engagement with said conductor in the gyrated position thereof corresponding to closed position of the vane, and means forming a fluid-tight seal in said bore between said contact and said passageway.

References Cited in the file of this patent

UNITED STATES PATENTS

| Number | Name | Date |
|---|---|---|
| 659,855 | Meloon | Oct. 16, 1900 |
| 968,358 | Jacobson | Aug. 23, 1910 |
| 1,836,284 | Scheibell | Dec. 15, 1931 |
| 2,014,042 | Fox | Sept. 10, 1935 |
| 2,312,980 | Root | Mar. 2, 1943 |
| 2,347,830 | Kiburz et al. | May 2, 1944 |
| 2,421,768 | Voliazzo et al. | June 10, 1947 |

FOREIGN PATENTS

| Number | Country | Date |
|---|---|---|
| 338,602 | Great Britain | Nov. 24, 1930 |
| 717,824 | Germany | Feb. 23, 1942 |